United States Patent
Swidler et al.

(12)

(10) Patent No.: US 6,393,578 B1
(45) Date of Patent: May 21, 2002

(54) METHOD AND SYSTEM FOR LOCATING DIGITAL CONTENTS IN A RECORDED DIGITAL FILE WITHOUT KNOWING ITS ENCODING FORMAT

(75) Inventors: Thomas Ulrich Swidler, San Jose; Bruce Alan Fairman, Woodside, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/457,937

(22) Filed: Dec. 8, 1999

(51) Int. Cl.$^7$ .............................. G06F 1/14; G06F 17/30
(52) U.S. Cl. ............................ 713/600; 713/502; 707/1
(58) Field of Search ................................. 713/400, 500, 713/502, 600; 707/1, 2, 3

(56) References Cited

U.S. PATENT DOCUMENTS

| | | | | |
|---|---|---|---|---|
| 6,226,241 B1 | * | 5/2001 | DaAmato et al. | 369/47.15 |
| 6,247,069 B1 | * | 6/2001 | Smyers | 710/8 |
| 6,266,727 B1 | * | 7/2001 | Smyers et al. | 710/105 |
| 6,292,844 B1 | * | 9/2001 | Smyers et al. | 710/5 |

FOREIGN PATENT DOCUMENTS

| | | | | |
|---|---|---|---|---|
| DE | 19539400 A1 | 5/1996 | | H04N/5/85 |
| DE | 19546327 A1 | 6/1997 | | G11B/20/10 |
| EP | 701374 A2 | 3/1996 | | H04N/7/24 |
| EP | 899964 A2 | 3/1999 | | H04N/7/52 |
| EP | 903738 A2 | 3/1999 | | G11B/20/12 |
| EP | 986062 A1 | 3/2000 | | G11B/27/32 |
| EP | 986248 A1 | 3/2000 | | H04N/5/00 |
| WO | WO 00/52693 | 9/2000 | | G11B/27/00 |

* cited by examiner

*Primary Examiner*—Dennis M. Butler
(74) *Attorney, Agent, or Firm*—Wagner Murabito & Hao LLP (57) ABSTRACT

A method and system locating contents of a recorded digital audio/video file without knowing its encoding format. The method and system can be implemented on a disk drive, e.g., magnetic or optical, or on any suitable storage mechanism. A bus timer is used for periodically generating a cycle count in synchronization with isochronous packets that are also on the bus. The disk drive stores both the current cycle count and the current digital packet together on a storage media, e.g., magnetic or optical or memory array, etc. When the cycle count value reaches a predetermined number of increments, a seconds measure is incremented thereby updating a minute and hour measure (as necessary). The updated hour/minute/second value is stored in an entry of an index table along with the logical block address (LBA) of the currently stored data packet. This continues until the file is completely recorded. Retrieval of a particular hour/minute/second of the file can then be readily accomplished by referencing the index table and obtaining the appropriate LBA without requiring knowledge of the particular encoding format used by the file. The index table is stored in the file system and associated with the particular file (track). The recorded cycle counts can be used as an offset to obtain a particular frame when frame accuracy is required. In one embodiment, the IEEE 1394 bus is used which generates one cycle count every 125 us. The drive maintains its own file system and can send data on the bus and store information without requiring continuous operational control from an intelligent device.

31 Claims, 8 Drawing Sheets

| VIDEO/AUDIO FORMAT | BANDWIDTH | AVAILABLE TIME TO RECORD | |
|---|---|---|---|
| DV | 31.74 Mbits/s | 1 hours | 54 minutes |
| MPEG-II | 2 Mbits/s | 30 hours | 1 minutes |
| MPEG-II | 4 Mbits/s | 15 hours | 1 minutes |
| MPEG-II | 6 Mbits/s | 10 hours | 0 minutes |
| MPEG-II | 8 Mbits/s | 7 hours | 30 minutes |
| MPEG-II | 10 Mbits/s | 6 hours | 0 minutes |
| MPEG-II full ATSC HD | 19.39 Mbits/s | 3 hours | 6 minutes |
| MiniDisk | 1.23 Mbits/s | 48 hours | 49 minutes |
| CD | 2.56 Mbits/s | 23 hours | 27 minutes |

```
                    ┌─────────┐
                    │  ENTER  │
                    └─────────┘
                         │
                         ▼
┌───────────────────────────────────────────────────────────┐
│ RECEIVE REQUESTED ACCESS TIME (HR/MIN/SEC PLUS OFFSET IN  │ 610
│  FRAMES OR TIME, ETC.) FOR A SELECTED TRACK ON THE HARD   │
│                     DRIVE SUB-UNIT                        │
└───────────────────────────────────────────────────────────┘
                         │
                         ▼
┌───────────────────────────────────────────────────────────┐
│ ACCESS THE INDEX TABLE ASSOCIATED WITH THE SELECTED TRACK │ 615
│ AND LOOK UP THE HOUR, MINUTE, SECOND TIME IN THE TABLE AND│
│               ACCESS THE ASSOCIATED LBA                   │
└───────────────────────────────────────────────────────────┘
                         │
                         ▼
┌───────────────────────────────────────────────────────────┐
│           SEEK THE READ/WRITE HEAD TO THE LBA LOCATION    │ 620
└───────────────────────────────────────────────────────────┘
                         │
                         ▼
┌───────────────────────────────────────────────────────────┐
│       CONVERT THE OFFSET (IN FRAMES OR MS) INTO CYCLE     │ 625
│                         COUNTS                            │
└───────────────────────────────────────────────────────────┘
                         │
                         ▼
┌───────────────────────────────────────────────────────────┐
│   STARTING AT THE LBA LOCATION, LOAD A SEGMENT OF DATA    │ 630
│                       INTO SRAM                           │
└───────────────────────────────────────────────────────────┘
                         │
                         ▼
┌───────────────────────────────────────────────────────────┐
│  SEARCH THROUGH THE DATA IN SRAM LOOKING FOR THE PROPER   │ 635
│               CYCLE COUNT AT WHICH TO START               │
└───────────────────────────────────────────────────────────┘
                         │
                         ▼
┌───────────────────────────────────────────────────────────┐
│  AT THE PROPER CYCLE COUNT, START SENDING DATA ONTO THE   │ 640
│ COMMUNICATION BUS AND CONTINUE READING FROM DISK AND      │
│ SENDING ON THE COMMUNICATION BUS UNTIL EOF IS REACHED     │
└───────────────────────────────────────────────────────────┘
                         │
                         ▼
                   ┌──────────┐
                   │  RETURN  │
                   └──────────┘
```

FIGURE 8

METHOD AND SYSTEM FOR LOCATING DIGITAL CONTENTS IN A RECORDED DIGITAL FILE WITHOUT KNOWING ITS ENCODING FORMAT

BACKGROUND OF THE INVENTION

1. Field of the Invention

The present invention relates to the field of storage and retrieval of digital encoding information such as audio/video material. More specifically, the present invention relates to the field of retrieving contents of a recorded digital file without prior knowledge of the encoding format of the recorded digital file.

2. Related Art

Audio/visual (AV) material is increasingly stored, transmitted and rendered using digital data. Digital video representation of AV material facilitates its usage with computer controlled electronics and also facilitates high quality image and sound reproduction. Digital AV material is typically compressed ("encoded") in order to reduce the computer resources required to store and transmit the digital data. The systems that transmit multimedia content encode and/or compress the content to use their transmission channel efficiently because the size of the multimedia content, especially video, is very large. Digital AV material can be encoded using a number of well known standards including; for example, the DV (Digital Video) standard, the MPEG (Motion Picture Expert Group) standard, the JPEG standard, the H.261 standard, the H.263 standard, the MiniDisk standard, the, CD standard and the Motion JPEG standard to name a few. As expected, the encoding standards also specify the associated decoding processes as well. The multimedia contents are typically stored on the storage media and are transmitted as bitstreams than can be packetized.

The MPEG format is a compression standard for audio, video and graphics information and includes, for example, MPEG1, 2, 4 and 7. it is standardized in the ISO-IEC/JTC1/SC29/WG11 documents. For instance, MPEG1 is the standard for encoding audio and video data for storage on CD-ROM devices(compact disc read only memory). The MPEG1 specification is described in the IS-11393 standard. The MPEG2 format is the standard for encoding, decoding and transmitting audio/video data for storage media, e.g., DVD (digital video disc), etc., and also for digital broadcasts. MPEG2 supports interlaced video and is therefore used for high quality video displaying on TV units. The MPEG2 specification is described in IS-13818. The MPEG4 standard is used for encoding, decoding and transmitting audio, video and computer graphics data. It supports content based bitstream manipulation and representation. The specification is described in IS14496. MPEG7, currently under standardization, pertains to meta information of multimedia (MM) contents. The example of the meta data is data that describes or is related to the MM contents, such as, identification and/or other descriptions of the author, producer information, directors, actors, etc. The draft specifications for MPEG7 are described in the ISO-IEC-JTC1/SC29/WG11 documents.

The H.261 and H.263 standards of compression are for audio and visual data. These standards are described by the ITU-T (International Telecommunication Union). The H.261 standard is used for TV conference systems, while the H.263 standard is used for mobile communication. The H.261 and H.263 standards adopt the hybrid coding of Motion Compensation (MC) and Discrete Cosine Transform (DCT). The details of these specifications are described in ITU-T recommendations which- are well known. JPEG is the compression standard used for still images. It is standardized in ISO-IEC/JTC1/SC29/WG1 documents. The JPEG standard uses transform coding (DCT) as is also used in the JPEG standard. The WG1 is standardizing JPEG2000, which is a more efficient encoding technology for still image processing. The JPEG2000 standard uses wavelet transformation. Motion JPEG is the defacto standard for video processing. In Motion JPEG, each frame of the video is encoded by JPEG. It is used in the Digital Video (DV) standard, which is used in the market today. Interframe correlation is not used for the compression.

Digital information encoded in any of the above discussed formats can be stored magnetically and/or optically on storage media often called "disk media." The digital storage media can be removable, as in the case of a floppy disk or optical compact disk (CD) or the media can be non-removable such as the platters of a hard disk. A data retrieval problem occurs, however, when digital files of various encoding formats are allowed to be stored on the same disk. More specifically, it is very difficult to access a particular portion of a stored file (e.g., a particular location in time of the material) when files of different formats are stored on the same disk in part because the bit rates for the various encoding formats are different.

Figure 1:
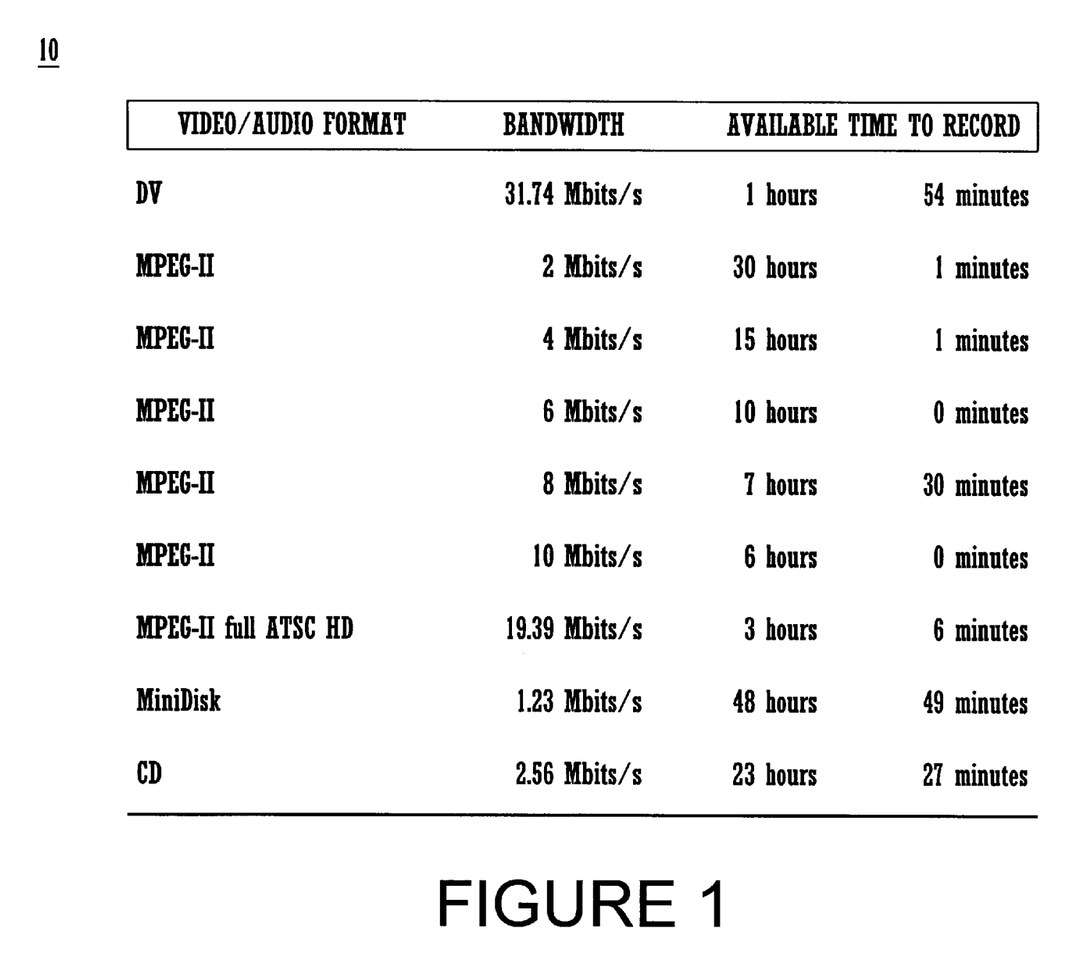
FIG. 1 illustrates a table of different encoding formats used for audio/video (AV) digital files and their associated bit rates (bandwidth) and their maximum storage time based on an example of a maximum capacity of 27 Gbytes.

FIG. 1 illustrates a chart 10 of the average bit rates (bandwidth) for different MPEG-II encoding formats and also illustrates the bit rate for DV, MiniDisk and CD formats. FIG. 1 also illustrates, for each format, the maximum storage for a storage medium having a capacity of 27.0 Gigabytes. As seen by these bit rates, different types of video and/or audio formats occupy a different amount of space on the hard drive because their bit rates are different. For instance, the first MPEG II format uses 2Mbit/sec and can store 30 hours, 1 minute on a media (with a 27 Gbyte capacity) but the last MPEG II format can store 3 hours, 6 minutes on the same media. Under a single retrieval format, the drive can use its knowledge of the bit rate for a particular file format to compute a location in time for that file. However, one disadvantage of this method is that a retrieval format for one encoding type will not work with other formats because the bit rates are different. This solution is not acceptable for disk systems that store files of different formats on the same disk.

Another problem is introduced when dealing with formats that have average bit rates, such as MPEG. For MPEG II, the bit rates specified in FIG. 1 are only the average bit rates for the files and individual bit rates for various file portions can be larger or smaller than this value. As a result, the type of computation described above can be very inaccurate thereby requiring a degree of padding when seeking to a desired location in time of the file. For instance, if a disk drive knows that a particular file is encoded using a particular MPEG format (e.g., because the drive only stores files of one format), then it can use the average bit rate value to seek to a position near a desired playback location. However, because the bit rates are only average rates, the drive typically then seeks backward in the file some predetermined amount ("padding") in order to ensure that the desired playback position is not missed. Unfortunately, using this prior art retrieval process, a certain amount of extra file contents (padding) are supplied to the decoder unit and then the decoder unit looks to discover the actual playback position. This generally creates an unwanted and noticeable delay in obtaining the desired file contents.

The type of delay described above can be reduced by including complex decoder circuits in each drive that can quickly seek to the desired location by decoding the file contents and seeking forward or backward for the desired location on the disk. However, this is a costly approach because a separate decoder circuit is required for each file format that the drive could accept. Not only is this approach costly, but it is not expandable to cover other, future, file formats not yet adopted or suggested.

SUMMARY OF THE INVENTION

Accordingly, what is needed is a generic disk drive storage and retrieval system that can accurately seek to a desired location in a digital file without knowing, prior, the encoding format of the file. A generic storage and retrieval system is well suited for disk systems that store files of different formats on the same disk. What is also needed is a generic storage and retrieval system that can accurately seek to the desired file location without causing a noticeable delay in obtaining the file contents. What is needed yet is a generic storage and retrieval system that is not costly and does not require separate and complex decoder units for each different file format that the disk drive accepts. The present invention provides these advantages and others not specifically mentioned above but described in the sections to follow.

A method and system are disclosed for locating contents of a recorded digital audio/video file without knowing the encoding format used for the digital audio/video file. The method and system can be implemented on a disk drive, e.g., magnetic or optical, or any suitable storage mechanism. A bus timer is used for periodically generating a cycle count in synchronization with isochronous packets that are also on the bus. The disk drive receives these cycle counts with an isochronous digital packet and stores both the cycle count and the digital packet together on a storage media, e.g., magnetic or optical or memory array, etc. When the cycle count value reaches a predetermined number of increments, a seconds measure is incremented thereby updating a minute and hour measure (as necessary). The updated hour/minute/second value is then stored in an entry of an index table along with the logical block address (LBA) of the currently stored data packet. This continues until the file is completely recorded on the disk. Retrieval of a particular hour/minute/second of the file can then be readily accomplished by referencing the index table and obtaining the appropriate LBA without requiring knowledge of the particular encoding format used by the file. The index table is stored in the file system and associated with the particular file (track). The recorded cycle counts can be used as an offset to obtain a particular frame when frame accuracy is required. In one embodiment, the IEEE 1394 communication bus is used which generates one cycle count every 125 us. The drive maintains its own file system and can dump data on the bus and store information without requiring continuous operational control from an intelligent device, such as a computer system.

More specifically, an embodiment of the present invention includes a method of storing contents of a digital file onto a storage medium having the steps of: a) receiving the contents of the digital file in isochronous packets wherein each isochronous packet is accompanied by a respective timer count; b) storing the isochronous packets with their respective timer counts onto the storage medium; c) provided the timer count exceeds a predetermined count, generating a new entry in an index table that is associated with the digital file, the step c) comprising the steps of: c1) updating a time measure; c2) obtaining a logical block address at which the most recent isochronous packet was stored by step b); and c3) recording the time measure along with the logical block address into the new entry. Embodiments include the above and wherein the storage medium is a magnetic disk or an optical disk. Embodiments also include the above and further comprising the step of d) causing a bus interface to increment the timer count upon each isochronous packet and generating a signal (e.g., an interrupt) upon the timer count exceeding the predetermined count to invoke step c). Embodiments also include a disk drive implemented in accordance with the above storage method.

An embodiment also include, in a disk drive, a method of retrieving a portion of a digital file from a storage medium having the steps of: a) receiving a file location comprising a time measure; b) indexing, within a memory, an index table to obtain a logical block address associated with the time measure, the index table comprising a plurality of entries each associating a respective time measure with a respective logical block address; c) on the storage medium, seeking within the digital file to the logical block address associated with the time measure; d) storing, into a memory, a portion of the digital file commencing at the logical block address; and e) transmitting the portion of the digital file within the memory onto a bus. Embodiments also include the above and wherein the digital file comprises a plurality of discrete packets each discrete packet having an associated count value stored therewith on the storage medium and wherein the file location also comprises a frame offset value and further comprising the step of converting the frame offset value into a timer count value (such step can occur inside or outside the drive) and wherein the step e) comprises the steps of: e1) searching, in the memory, through the portion of the digital file until a point where a count corresponding to the timer count value is located within the digital file; and e2) transmitting the portion of the digital file on the bus commencing at the point discovered by step e1). Embodiments also include a disk drive implemented in accordance with the above retrieval method.

DETAILED DESCRIPTION OF THE INVENTION

In the following detailed description of the present invention, a generic storage and retrieval method and system for retrieving selected portions of an AV digital file from a storage media without prior knowledge of the encoding format of the AV digital file, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 2:
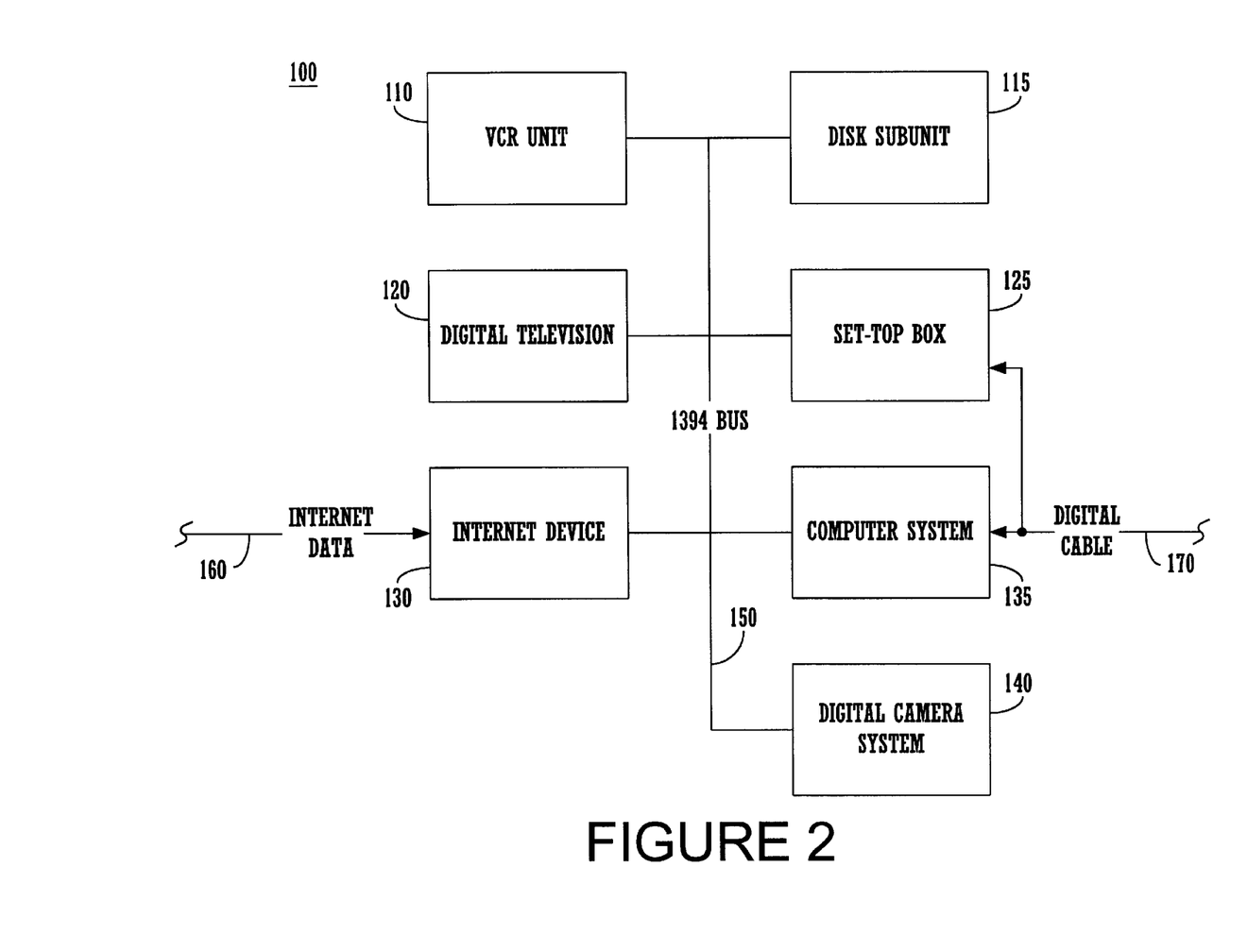
FIG. 2 is a block diagram of a network of electronic devices coupled together, including a disk subunit of the present invention, and using a common bus architecture for supplying digital AV files thereover.

FIG. 2 illustrates a block diagram of an electronic system 100 including several subunits connected by a common communication bus architecture. In one embodiment, the bus selected is the digital IEEE 1394 serial communication bus. However, it is appreciated that other digital bus architectures can also be employed (e.g., parallel or serial) consistent with the present invention, such as for example, the IDE communication bus or the SCSI communication bus, or the IEC 61883 bus, all of which are well known in the art. Electronic system 100 can be considered a home or office entertainment network and includes, for example, a video cassette recorder (VCR) unit 110, a digital television unit 120, a set-top-box 125 for receiving a cable input 170, a computer system 135 also receiving the cable input 170, an Internet device 130 connected to the Internet (world-wide web) by digital connection 160, a digital camera system 140 (which may include one or more digital cameras having a miniature display device) and a disk subunit (server) 115 of the present invention. Disk subunit 115 is capable of storing multiple files (tracks) with each one having a different encoding format.

It is appreciated that the Internet device 130 could be a separate unit, as shown, or integrated within the computer system 135. It is also appreciated that one or more of the units shown in FIG. 2, except the disk subunit 115, can be eliminated or replaced in accordance with the present invention. Digital cable input 170 can be terrestrial or satellite cable. Set-top-box unit 125 can include one or more tuners or descrambling devices and may accept a user input key.

Disk subunit 115, an embodiment of the present invention, provides storage of digital files that are provided to it from the bus 150. The digital files, in one embodiment, are audio/video (AV) digital files and can represent multimedia content that originates from another unit or units within system 100. For instance, the VCR 110 can present an AV digital file onto bus 150 for recording. The Internet device 130 or the computer system 135 can also present a digital AV file onto bus 150 for recording. Also, the digital camera system can present a live digital AV file onto bus 150 for recording. It is appreciated that any number of devices can present digital AV files onto bus 150 that are to be recorded by disk subunit 115.

The AV files presented on bus 150 can be encoded and are transmitted in isochronous packets. In one implementation, the AV files are presented onto the bus at their playback rates, but alternatively, could be presented at other speeds, e.g., ½x, 1x, 2x, 4x, 10x, etc., of their playback rates. Since any number of devices can present AV digital files onto bus 150 for recording, any number of different encoding schemes can be used for the files. As shown in FIG. 1, any of these encoding schemes (and others that are well known) can be used with respect to the files presented on bus 150. In accordance with the present invention, disk subunit 115 records all encoded digital files (and provides playback) without respect to their encoding formats. Recording is based on time, not encoding format and files without any encoding format can be recorded.

The disk subunit 115 of FIG. 2 is also capable of playing back a recorded file and presenting this file onto bus 150, e.g., for presentation by digital television unit 120, tho computer system 135, the digital camera system 140, or by any other suitable playback device. The disk subunit 115 contains circuitry and software for providing a generic file storage and retrieval system that will playback any selected portion or portions of the recorded digital file without knowing the encoding format of the file. In one implementation, file portions are identified by playtime (e.g., a time measure). The ability to provide a generic storage and retrieval system is very advantageous within system 100 because the number of coupled devices within system 100 makes it likely that files of various different encoding formats will be stored on disk subunit 115. It is appreciated that disk subunit 115 also has an intelligent file system giving it the capability of retrieving a file, or portion thereof, with little or no control and/or involvement from a controller, e.g., the set-top-box 125 or the computer system 135.

Figure 3:
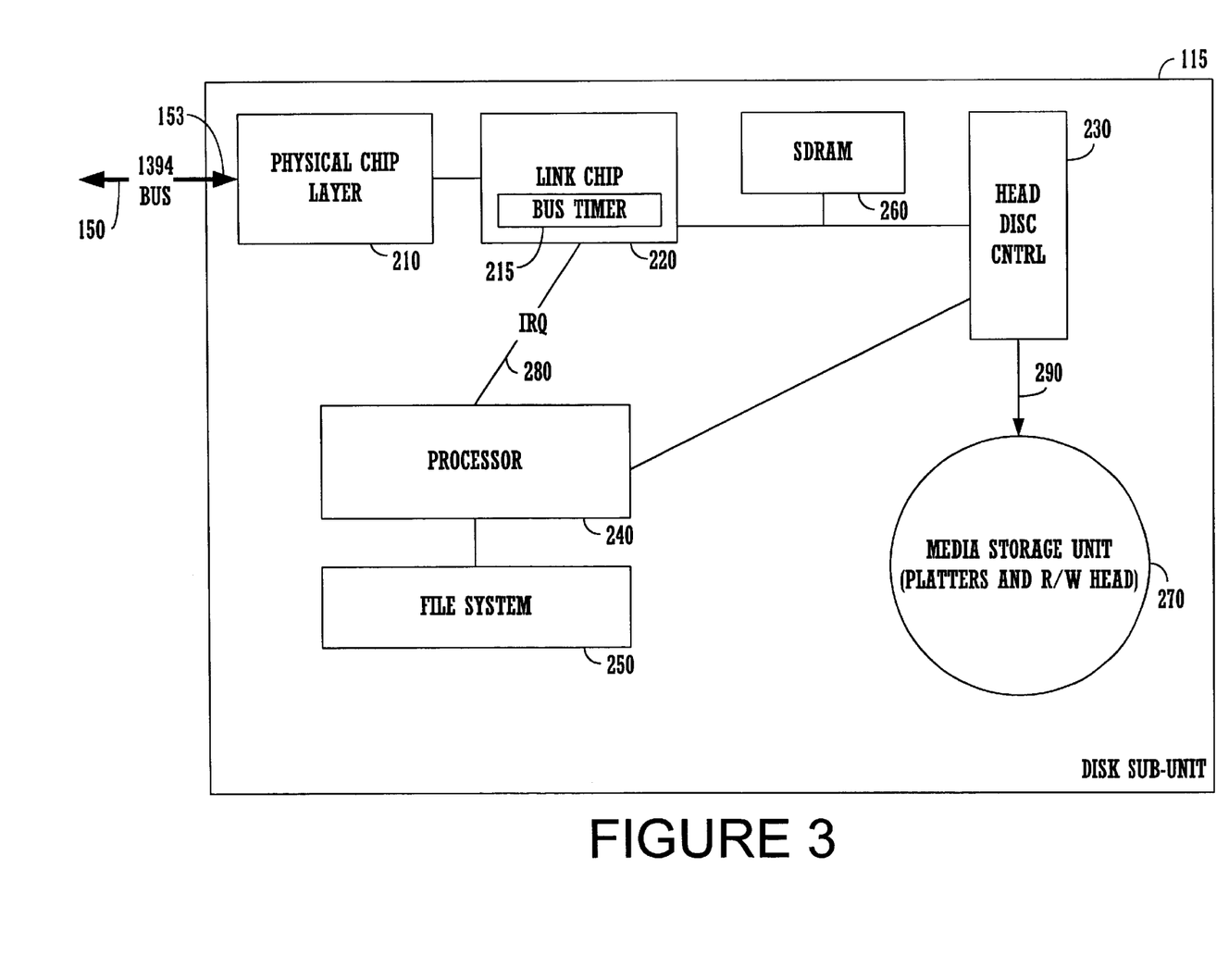
FIG. 3 is a block diagram of the disk subunit of the present invention.

FIG. 3 illustrates an embodiment of the disk subsystem 115 (e.g., a "hard disk" in one implementation) in accordance with the present invention. As shown, disk subsystem 115 contains a port 153 for coupling to a communication bus 150. In the preferred embodiment, an IEEE 1394 bus is selected but any digital bus could be used, such as an IDE or a SCSI bus. Port 153 resides on a physical chip 210 which provides well known IEEE 1394 physical layer communication decoding. Physical chip 210 is implemented in accordance with the IEEE 1394 bus architecture standards. The physical chip 210 is connected to a link chip 220 which includes a special bus timer circuit 215 for generating (or receiving) timing signals that maintain a special cycle_time register. It is appreciated that the link chip 220 and the physical chip 210 could also be integrated into a single chip.

Within the IEEE 1394 bus architecture, also known as "iLINK" and "Firewire," isochronous capable nodes implement two timer-based registers called cycle_time and bus_time. Writes to these registers initialize a time value using the write data value. This time value can be reset (e.g., become non-monotonic) upon a bus reset. The bus manager node or the isochronous resource manager, "cycle master," (if the bus manager is absent) is responsible for initializing the timing value. The register is then updated based on a 24.576 MHz clock. The timing value is used to generate the 125us bus timing intervals and to synchronize all isochronous nodes at the start of each isochronous cycle, which occurs at nominal 125us intervals. The cycle_time register contains three counters: 1) second_count; 2) cycle_count (0 to 7999); and 3) cycle_offset (0 to 3071), that are incremented by the 24.576 MHz clock. Each counter is accessible as afield within the cycle count register. The cycle_offset field (12-bits) wraps to zero after count 3071 (providing 125us intervals) and increments the cycle_count field. The cycle_count field (13-bits) counts from 0 to 7999 before wrapping to zero and carrying to the second_count field at 1 second intervals. The second_count field (7-bits)

wraps to zero after counting to all ones (127) and increments the second_count_hi field of the bus_time register.

It is appreciated that the contents of the cycle_time register are delivered at the beginning of each isochronous cycle, each 125us, and are contained within the cycle start packet within a field called the cycle_time_data. Also delivered within an isochronous cycle is a packet of data representing a portion of any digital file on bug 150 for storage to disk subunit 115 or played back from disk subunit 115. Isochronous cycles commence every 125us in one implementation of the IEEE 1394. Therefore, when the disk subunit 115 is receiving a digital file over bus 150, the cycle_count register will increment by one for each isochronous cycle of the bus 150.

Table I below illustrates a few exemplary isochronous packets for an exemplary digital file received at port 153 of disk subunit 115.

TABLE I

| AV File "X" | | |
|---|---|---|
| Iso-cycle | cycle count | X's Digital Packet |
| i | 6770 | i |
| i + 1 | 6771 | i + 1 |
| i + 2 | 6772 | I + 2 |
| * * * | * * * | * * * |
| i + n | 7999 | i + n |
| i + n + 1 | 0 | i + n + 1 |
| i + n + 2 | 1 | i + n + 2 |

Each time the cycle_count register wraps around to zero, one second has elapsed on the bus 150. The physical chip 210 of FIG. 3 is coupled to a link chip 220 that provides well known IEEE 1394 link layer communication according to the IEEE 1394 bus architecture. The link chip 220 generates an interrupt signal over line 280 each time the cycle_count increments by 8000. In a simple case, this can occur each time the cycle_count wraps around to zero. The link chip 220 is coupled to a head disk controller (HDC) 230. HDC 230 is coupled to a synchronous dynamic random access memory (SDRAM) 260. HDC 230, in write mode, provides digital data from SDRAM 260 (from bus 150) over address/data bus 290 for writing to the non-volatile storage medium 270 (e.g., magnetic disk, optical disk, memory array, etc.). In the preferred embodiment, storage medium are magnetic disk platters and unit 270 includes the mechanisms required to read write digital data onto the magnetic medium, such as read/write heads, head disk assembly, actuators, voice-coil, servos, etc. In read mode, the HDC 230 reads data from the media 270 into SDRAM 260. The link 220 takes the data from the SDRAM 260 and provides it onto bus 150 via the physical 210 chip.

A processor 240 of FIG. 3 controls the disk subunit 116 and is coupled to the HDC 230 and also coupled to a file system 250. Processor 240 also receives the signal line, e.g., interrupt line 280, from the link chip 220.

Figure 4:
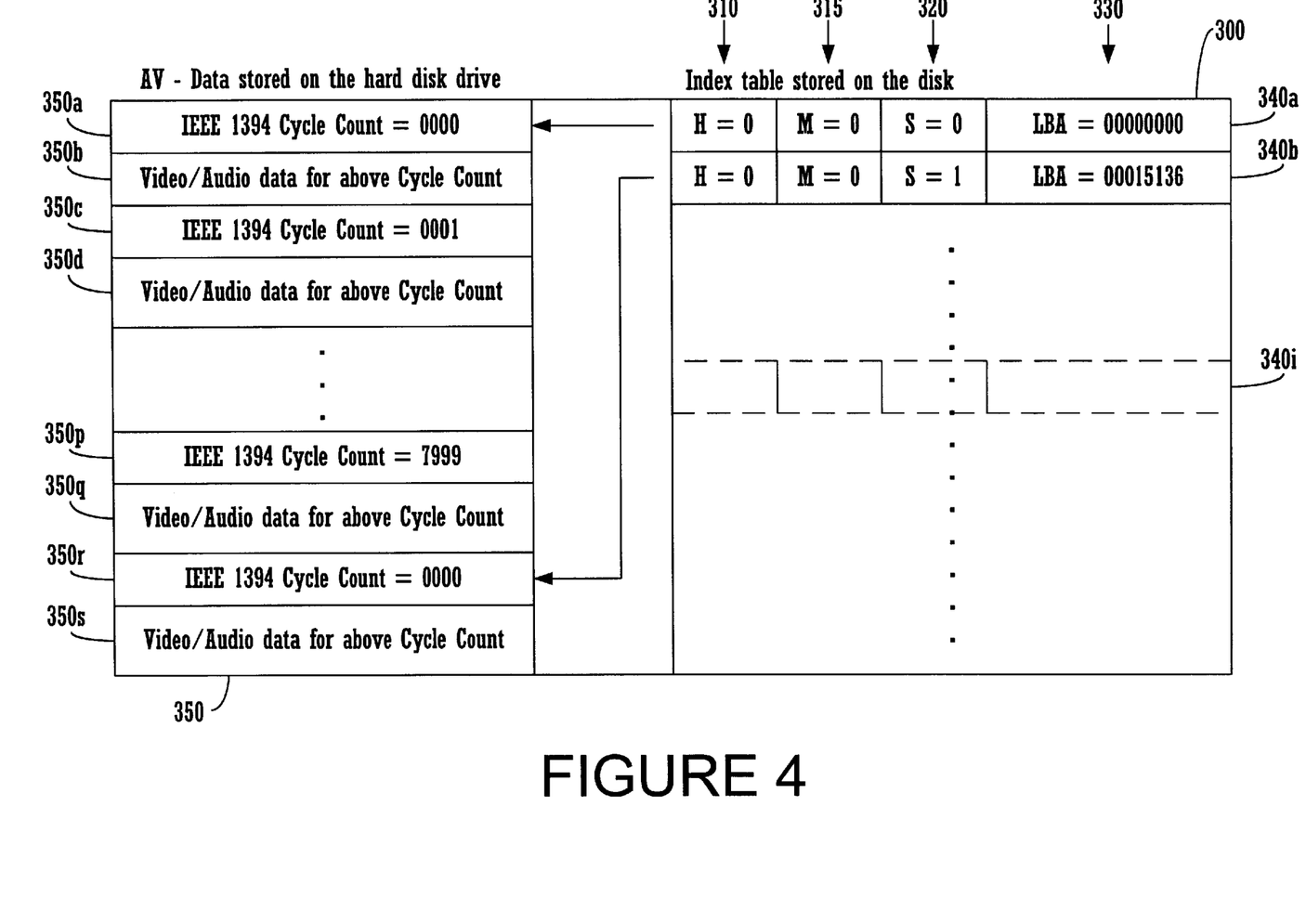
FIG. 4 illustrates a portion of a digital AV file stored in accordance with an embodiment of the present invention and also illustrates an index table created by an embodiment of the present invention for the digital AV file.

Refer to FIG. 4 and FIG. 3. During write mode, as isochronous packets of a digital file are retrieved from bus 150, the present invention writes the contents of the isochronous packet along with its associated cycle_count to the storage medium 270. What results is the recorded digital file 350 as shown in the format of FIG. 4. FIG. 4 illustrates a portion 350 of a digital file recorded in accordance with the present invention. The cycle_count can come before or after its associated packet and in the preferred embodiment it is shown as coming first. File portion 350 starts with a cycle_count of zero 350a, and its isochronous packet 350b. Next is cycle_count one 350c with its associated isochronous packet 350d. More packets are written and then cycle_count of 7999 350p is written along with its associated isochronous data packet 350q. The cycle_count then wraps to zero as shown by 350r and its associated isochronous data packet 350s.

While the data 350 is written to the storage medium 270, the link chip 220 generates a signal (e.g., an interrupt) to the processor 240 each time the cycle_count increments by 8000, which can be simplified to each time it wraps to zero. This causes an entry to be generated within an index table 300 also shown in FIG. 4. There is one index table 300 associated with each digital file recorded by the disk subunit 115 and it is stored in the file system 250. It is appreciated that with respect to the initial state of recording, an entry is also written into the index table 300 upon the first isochronous packet of a digital file being received whether or not the cycle_count is then zero. When a new entry is written into the index table of a digital file, the logical block address (LBA) of the last written isochronous data packet is recorded adjacent to the current time measure. The time measure, in one embodiment of the present invention, includes a second (s), minute (m) and hour (h) value and can be maintained by the processor 240. The seconds value updates the minute value which updates the hour value as necessary.

The seconds value is updated upon each signal (e.g., interrupt) generated by the link chip 220. In other words, the second value is updated, during the write mode, each time the cycle_count is incremented 8000 times. Taking into consideration the cycle_count value at the start of recording and possible subsequent bus resets, 8000 increments may or may not coincide with the zero wrap around of the cycle_count register. FIG. 4 uses the zero wrap around condition of the cycle_count register only to provide a simplified and clear example.

In an alternate embodiment, the signal sent to the processor, e.g., the interrupt, is generated by a transfer of a block containing a flag to the medium which allows for the LBA to be readily captured.

FIG. 4 illustrates two exemplary entries 340a and 340b within the index table 300 corresponding to the portion 350 of the digital file. Entry 340a represents the start of portion 350 and the LBA of section 350a is recorded along with an initialized time measure (h=0, m=0, s=0). The next entry 340b represents the LBA of section 350r where the cycle_count has incremented 8000 times since the last entry 340a. This represents the expiration of approximately one second, so the associated time measure is (h=0, m=0, s=1). It is appreciated that the above process occurs without any consideration to the type of encoding used by the digital file being recorded.

Figure 5:
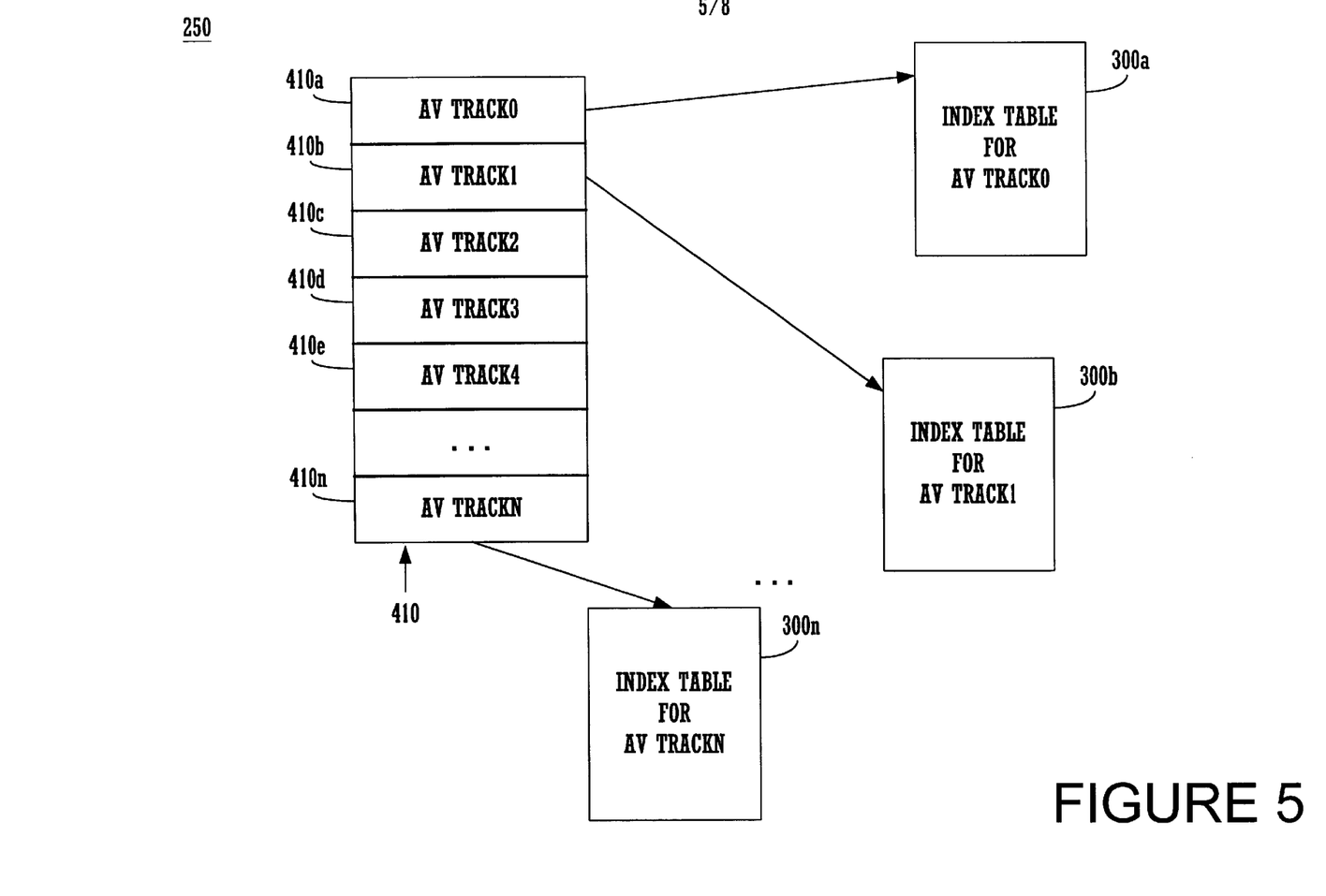
FIG. 5 illustrates elements of the file system in accordance with an embodiment of the present invention including an index table associated with each stored AV digital file ("track").

FIG. 5 illustrates the contents of the file system 250 (FIG. 3) in more detail. A file index 250 contains an entry for each digital file recorded on the storage medium 270. Each entry also contains a pointer to the index table associated with each file (also called a "rack"). For instance entry 410a (track0) points to index table 300a, entry 410b (track1) points to index table 300b and entry 410n (track n) points to index table 300n.

Upon playback of a recorded digital file, the disk subunit 115 receives a requested file identifier (e.g., file name) and a requested start (or "access") time. The index table for that file is then referenced by the start time to obtain a corresponding LBA for the start time. The HDC 230 is then requested to seek to that LBA and start reading the digital file and supplying it to bus 150. The file continues to be read, according to the index table, until the end of the file is reached or some other termination activity is invoked.

Figure 6:
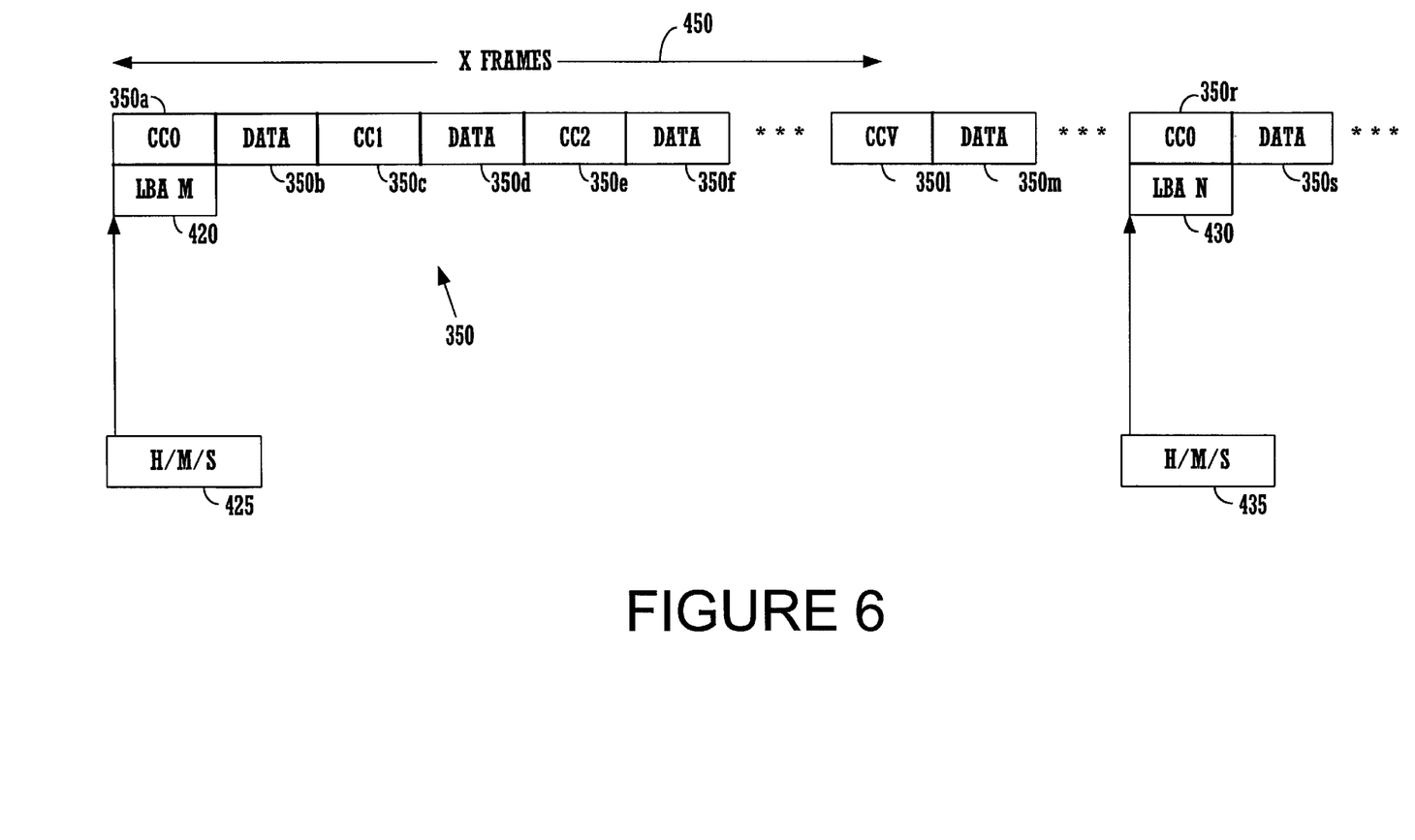
FIG. 6 is an illustration of an AV digital file stored in accordance with an embodiment of the present invention including stored cycle counts and logical block address (LBA) markers.

FIG. 6 illustrates an embodiment of the present invention capable of performing frame accurate playbacks. In cases when one second granularity is not accurate enough for the playback of a recorded file, the present invention can provide a frame accurate playback. In this embodiment, the requested start time is provided in hours, minutes and seconds with an additional frame offset value. Frames are presented in either 30 Hz (NTSC) or 25 Hz (PAL) or 24 Hz (FILM), typically, and therefore, the frame offset number can be converted into cycle_counts using the below relationship:

$$cc\_offset=(frame\_offset/frame\_rate) *7999$$

where cc_offset is the cycle_count offset, frame_offset is the offset value given in the start time, and frame_rate is the frame rate (e.g., either 30 or 25 or 24). Another relationship can also be used to compute the cycle count offset:

$$cc\_offset=(7999/frame\_rate)*(frame\_offset)$$

Alternatively, time or cycle_count values can also be directly given in the requested start time thereby obviating the above computation.

A digital file 350 is shown in FIG. 6 including two LBA markers 420 and 430. LBA M marker 420 corresponds to isochronous packet 350b and points to its cycle_count 350a (cc=0). LBA N marker 430 corresponds to isochronous packet 350s and points to its cycle_count 350r (cc=0). Start time marker indicated a time measure, h/m/s 425, that referenced LBA M 420. Start time marker also included a frame offset that was translated into X number of cycle_counts 450. X number of cycle_counts away from cycle_count 0 at section 350a is section 350l (cycle_count v).

Using the cc_offset value, the first LBA is obtained from the index table and a portion of the digital file is then loaded into the SDRAM 260. The link chip then scans through this memory looking for a recorded cycle_count that is cc_offset number of increments away from the first cycle_count of the LBA. At this point, the digital file is then supplied to the bus 150 thereby ignoring any portion of the file within the SDRAM 260 that exists before this point. Continuous read out of the digital file then continues normally using the index table for the digital file. Relating this back to FIG. 6, the digital file from section 350a–350m (and beyond) is obtained from the storage medium 270 and placed into SDRAM 260. The link chip then searches through this data looking for cycle_count v and from this point commences sending the digital file onto bus 150 thereby ignoring any sections before 350l, e.g., sections 350a–350r. The digital file continues playback at LBA N 430 (and so forth) in the normal manner. It is appreciated that the reading or playback process of the present invention does not require any knowledge of the encoding format of the digital file.

Figure 7:
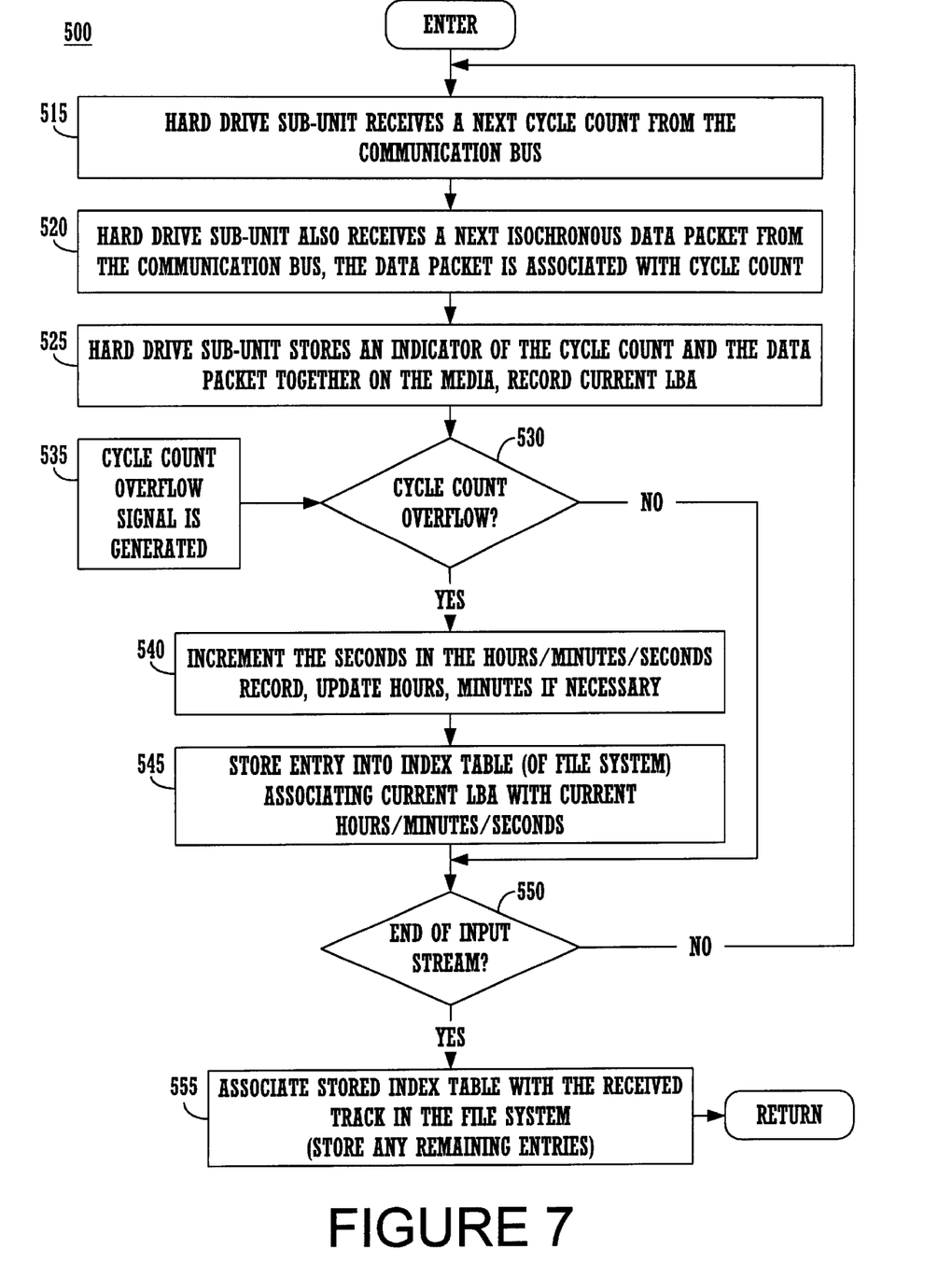
FIG. 7 is a flow diagram illustrating steps in a process for writing ("recording") a digital file of any encoded format onto a storage media in accordance with one embodiment of the present invention.

FIG. 7 illustrates a flow diagram of steps of the writing (or "recording") process 500 in accordance with the present invention. It is appreciated that many of the steps of process 500 can be implemented as processor instructions (software or firmware) executed by processor 240 (FIG. 3). Process 500 assumes a request to record a digital file has been received and a first entry into the file's index table has been made representing the first available LBA for the file. Each 1394 isochronous cycle (every 125us) the disk subunit 115 receives digital video and/or digital audio (AV data) in a digital file from the bus 150. At step 515, an isochronous digital packet is received by disk subunit 115. At step 520, simultaneous with the isochronous packet, a cycle_count value (0 to 7999) is also received. At step 525, the present invention stores the isochronous data packet on the storage medium available but preceded by an entry of its cycle_count value. Steps 515 and 520 can occur within an isochronous bus interval and can occur in any order or simultaneously.

Each time the cycle_count cycles through 8000 increments, e.g., from 0 to 7999 and to 0 again, one second has elapsed. A check is made at 530 to determine if this condition is present. In one implementation, interrupt routine 535 generates an interrupt representing this condition to step 530. If the condition has not yet been reached, then step 550 is entered where it is checked if the digital file has completed (end of file). If not, then step 515 is entered to obtain the next isochronous packet and cycle_count value.

If the condition at step 530 is reached, then step 540 is entered where the seconds in the hours/minutes/seconds field is incremented (thereby updating the minutes and hours values as necessary) and this new value is recorded into a new entry of the index table for the digital file. At step 540, the LBA representing the last recorded cycle_count and isochronous data packet is also recorded into the new entry. Step 550 is then entered. The above process continues, making one second entries into the index table until the digital file has been recorded. The disk subunit 115 is capable of controlling the recording process and updating its own file system without any need of external control (e.g., from a computer system or set-top-box) until the digital file is fully recorded. This is advantageous because recording processes then do not interfere with other operations concurrently being performed by the coupled computer system or set-top-box.

It is appreciated that one second granularity has been selected as an example only and that other levels of temporal granularity can also be used in building the index table, e.g., ½ sec, 2 sec, 4 sec, 10 sec, etc., within the scope of the present invention. It is appreciated that process 500 does not require any knowledge of the encoding format of the digital file being recorded.

Figure 8:
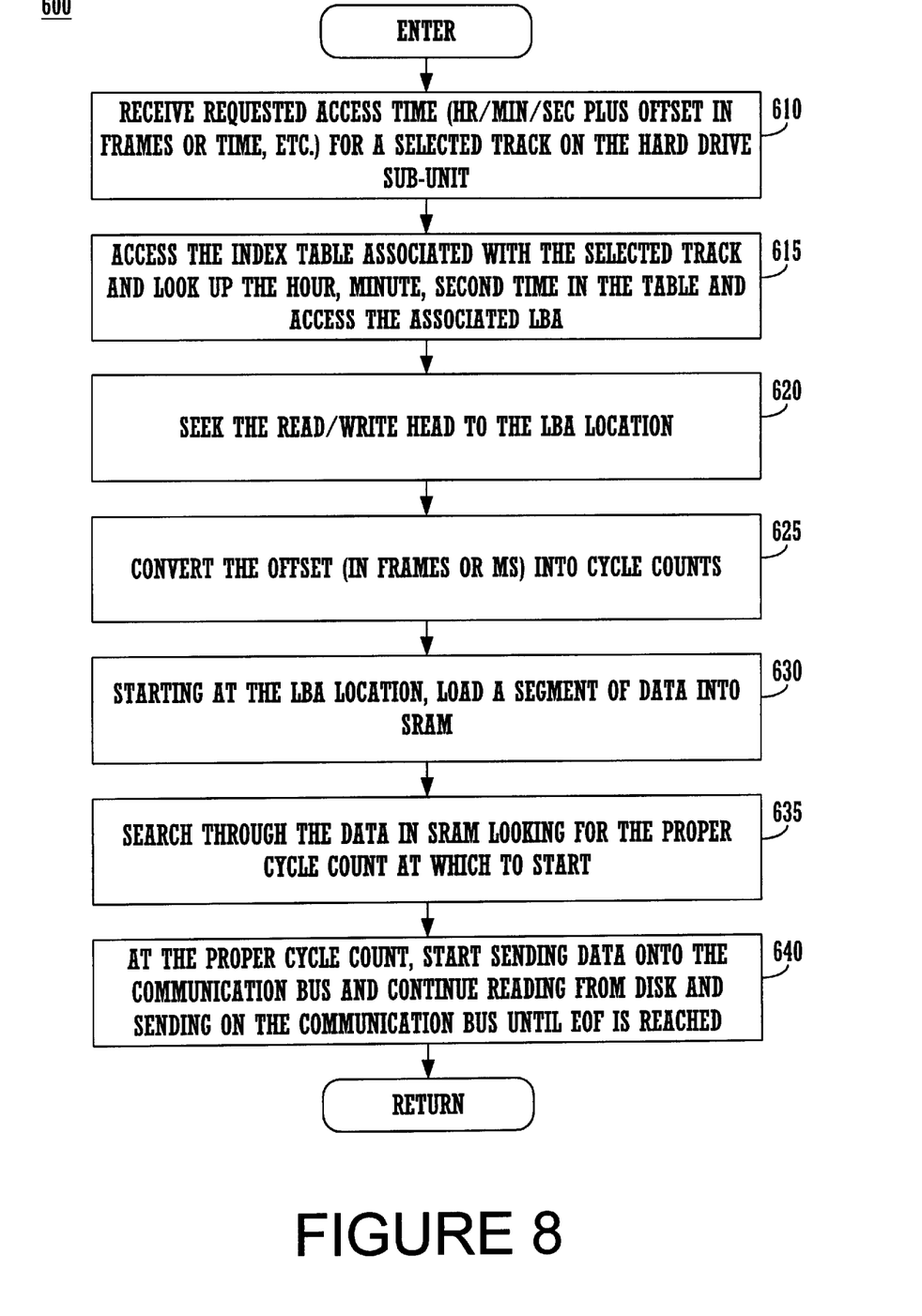
FIG. 8 is a flow diagram illustrating steps in a generic process for retrieving ("playback") a digital file (or any

FIG. 8 illustrates a flow diagram of steps of the reading (or "playback") process 600 in accordance with the present invention. It is appreciated that many of the steps of process 600 can be implemented as processor instructions (software or firmware) executed by processor 240 (FIG. 3). At step 610, a requested file identifier and a requested start time ("access time") are received by the disk subunit 115. As one example, assume the requested start time is 1 hour, 5 minutes, 20 seconds and a frame offset of 13 frames is also included. At step 615, the index table of the requested file is obtained and the time measure (e.g., 1 hours, 5 minutes, 20 seconds) is used to reference the index table to provide an output LBA. At step 620, the read channel commands the storage medium to seek to the given LBA location. At step 625, the present invention converts the frame offset value into a cycle_count offset (cc_offset) using the relationship described above. For instance, assuming a frame rate of 30 frames/second:

$$cc\_offset=(7999/30)*12=3199.6$$

This value should also be rounded down. Therefore, the actual cc_offset in this example is computed to be 3199.

At step 630, the present invention starts reading a portion of the digital file from the storage medium commencing at the current LBA and stores this portion into SDRAM. The cycle_counts of this data are then examined (which can occur as the data is being written into the SDRAM). The desired portion of the digital file is the one following the cycle_count stored in the SDRAM which matches the desired cycle count offset (3199 in this example). In other words, the cycle_count desired is the one that is 3199 increments past the first cycle_count recorded at the current LBA. From this cycle_count and forward, at step 640, the contents of the SDRAM are written onto bus 150 and the others ignored.

In one embodiment, at steps 630–640 of FIG. 8, if a stream processor is built into the link chip, then the processor can read/write or modify the data in real-time on the fly. Using this technique, the data read from the disk can simply be ignored until the cycle count stored on the storage medium matches the one desired. Only then does the link chip place the data on the bus 150 and therefore commence playing the desired material back down to frame based or cycle count accuracy.

It is appreciated that normal file playback continues at step 640 as the next portion of the digital file is obtained from the index table and placed onto bus 150 until the end-of-file is reached. It is appreciated that if the digital file is stored in contiguous storage addresses, there may not be any need to refer back to the index table during playback once the first LBA is obtained. During playback, no knowledge is required of the encoding format of the digital file. Therefore, the disk subunit 115 advantageously does not require any decoding hardware or software in order to implement a generic recording and playback process.

The disk subunit 115 is capable of controlling the playback process 600 and reading its own file system without any need of external control (e.g., from a computer system or set-top-box) until the digital file is fully played back. In other words, the disk subunit 115 acts autonomously. This is advantageous because playback processes then do not interfere with other operations concurrently being performed by the coupled computer system or set-top-box.

It is appreciated that while the preferred embodiment has been described with respect to the cycle_count register of an IEEE 1394 bus, however the present invention can be practiced with any communication bus having a global timer thereon or on any bus (e.g., IDE, SCSI, AMBA, etc.) provided a global timer can be integrated within the bus architecture. Furthermore, the preferred embodiment has been described as supplying the digital file to the disk subunit at the playback rate, e.g., 1×rate. However, the present invention can also accept digital files at other rates, e.g., ½× 2×, 4×, 10×, etc.

The preferred embodiment of the present invention, a generic storage and retrieval method and system for retrieving selected portions of an AV digital file from a storage media without prior knowledge of the encoding format of the AV digital file, is thus described. While the present invention has been described in particular embodiments, it should be appreciated that the present invention should not be construed as limited by such embodiments, but rather construed according to the below claims.

What is claimed is:

1. A method of storing contents of a digital file onto a storage medium comprising the steps of:
    a) receiving said contents of said digital file in isochronous packets wherein each isochronous packet is accompanied by a respective timer count;
    b) storing said isochronous packets with their respective timer counts onto said storage medium;
    c) provided said timer count exceeds a predetermined count, generating a new entry in an index table that is associated with said digital file, said step c) comprising the steps of:
        c1) updating a time measure;
        c2) obtaining a logical block address at which the most recent isochronous packet was stored by step b); and
        c3) recording said time measure along with said logical block address into said new entry.

2. A method as described in claim 1 wherein said storage medium is a magnetic disk.

3. A method as described in claim 1 wherein said storage medium is an optical disk.

4. A method as described in claim 1 wherein said storage medium is computer readable array memory.

5. A method as described in claim 1 wherein said digital file is an encoded audio/video digital file.

6. A method as described in claim 1 wherein said time measure records hours, minutes and seconds.

7. A method as described in claim 6 wherein said predetermined count corresponds to approximately one second.

8. A method as described in claim 1 further comprising the step of d) causing a bus interface to increment said timer count upon each isochronous packet.

9. A method as described in claim 8 further comprising the step of e) generating a signal upon said timer count exceeding said predetermined count and wherein said step c) is responsive to said signal of said step e).

10. A method as described in claim 1 further comprising the steps of:
    repeating steps a)–c) for a first digital file, a second digital file and a third digital file, respectively, to generate a first index table, a second index table and a third index table; and
    storing said first, second and third index tables in a file system and referencing each index table by its associated digital file.

11. A disk drive comprising:
    a) a first circuit operable to receive a digital file in isochronous packets from a bus and wherein each isochronous packet is accompanied by a respective timer count generated by said bus;
    b) a device operable to store said isochronous packets along with their respective timer counts within a storage medium wherein each isochronous packet is stored adjacent to its respective timer count; and
    c) a processor operable to generate a new entry in an index table that is associated with said digital file, provided said timer count exceeds a predetermined count, by performing the steps of:
        c1) updating a time measure;
        c2) obtaining a logical block address at which the most recent isochronous packet was stored by said device; and
        c3) recording said time measure along with said logical block address into said new entry.

12. A disk drive as described in claim 11 wherein said storage medium is a magnetic disk.

13. A disk drive as described in claim 11 wherein said storage medium is an optical disk.

14. A disk drive as described in claim 11 wherein said digital file is an encoded audio/video digital file.

15. A disk drive as described in claim 11 wherein said time measure records hours, minutes and seconds and wherein said predetermined count corresponds to approximately one second.

16. A disk drive as described in claim 11 wherein said bus increments said timer count upon each isochronous packet.

17. A disk drive as described in claim 11 further comprising means for generating an interrupt upon said timer count exceeding said predetermined count and wherein said processor is responsive to said interrupt to generate said new entry.

18. In a disk drive, a method of retrieving a portion of a digital file from a storage medium comprising the steps of:
   a) receiving a file location comprising a time measure;
   b) indexing, within a memory, an index table to obtain a logical block address associated with said time measure, said index table comprising a plurality of entries each associating a respective time measure with a respective logical block address;
   c) on said storage medium, seeking within said digital file to said logical block address associated with said time measure;
   d) storing, into a memory, a portion of said digital file commencing at said logical block address; and
   e) transmitting said portion of said digital file within said memory onto a bus.

19. A method as described in claim 18 further comprising the steps of:
   f) seeking to a next logical block address of said digital file as defined by said index table;
   g) storing, into said memory, a next portion of said digital file commencing at said next logical block address;
   h) transmitting said next portion of said digital file within said memory onto a bus; and
   repeating steps f)–h).

20. A method as described in claim 18 wherein said digital file comprises a plurality of discrete packets each discrete packet having an associated count value stored therewith on said storage medium and wherein said file location also comprises a frame offset value and further comprising the step of converting said frame offset value into a timer count value and wherein said step e) comprises the steps of:
   e1) searching, in said memory, through said portion of said digital file until a point where a count corresponding to said timer count value is located within said digital file; and
   e2) transmitting said portion of said digital file on said bus commencing at said point discovered by step e1).

21. A method as described in claim 20 further comprising the steps of:
   f) seeking to a next logical block address of said digital file as defined by said index table;
   g) storing, into said memory, a next portion of said digital file commencing at said next logical block address;
   h) transmitting said next portion of said digital file within said memory onto said bus; and
   repeating steps f)–h).

22. A method as described in claim 18 wherein said storage medium is a magnetic disk.

23. A method as described in claim 18 wherein said storage medium is an optical disk.

24. A method as described in claim 18 wherein said time measure records hours, minutes and seconds.

25. A method as described in claim 18 wherein said bus is substantially compliant with a version of the IEEE 1394 bus architecture standard.

26. A disk drive comprising:
   a) a processor for receiving a file location comprising a time measure;
   b) said processor also for indexing, within a memory, an index table to obtain a logical block address associated with said time measure, said index table comprising a plurality of entries each associating a respective time measure with a respective logical block address;
   c) a device for seeking on said storage medium within said digital file to said logical block address associated with said time measure;
   d) said device also for reading said digital file starting at said logical block address and storing into said memory; and
   e) means for transmitting said portion of said digital file within said memory onto a bus.

27. A disk drive as described in claim 26 wherein said digital file comprises a plurality of discrete packets each having an associated count value stored therewith and wherein said file location also comprises a frame offset value and wherein said processor is further for converting said frame offset value into a timer count value and wherein said means for transmitting comprises:
   e1) means for searching through said portion of said digital file in said memory until a point where a count corresponding to said timer count value is located in said digital file; and
   e2) means for transmitting said portion of said digital file onto said bus commencing at said point discovered by said means for searching.

28. A disk drive as described in claim 26 wherein said storage medium is a magnetic disk.

29. A disk drive as described in claim 26 wherein said storage medium is an optical disk.

30. A disk drive as described in claim 26 wherein said time measure records hours, minutes and seconds.

31. A disk drive as described in claim 26 wherein said bus is substantially compliant with a version of the IEEE 1394 bus architecture standard.

* * * * *